United States Patent [19]
Reuss et al.

[11] Patent Number: 5,844,978
[45] Date of Patent: Dec. 1, 1998

[54] MULTI-USER TELEPHONE LINE

[75] Inventors: Ronald S. Reuss, Atlanta; Janine M. Irwin, Duluth, both of Ga.

[73] Assignee: BellSouth Corporation, Atlanta, Ga.

[21] Appl. No.: 783,537

[22] Filed: Jan. 14, 1997

Related U.S. Application Data

[63] Continuation of Ser. No. 197,969, Feb. 17, 1994, abandoned.

[51] Int. Cl.$^6$ .............................. H04M 1/56; H04M 1/66; H04M 3/42
[52] U.S. Cl. ..................... 379/196; 379/112; 379/114; 379/182; 379/184; 379/201
[58] Field of Search ..................................... 379/199, 200, 379/201, 207, 230, 188, 91, 95, 112, 143, 144, 197, 177, 182, 183, 184; 340/825.3, 825.31, 825.5, 825.51, 825.52

[56] References Cited

U.S. PATENT DOCUMENTS

| | | | |
|---|---|---|---|
| 4,897,870 | 1/1990 | Golden | 379/144 |
| 5,247,571 | 9/1993 | Kay et al. | 379/230 |
| 5,392,357 | 2/1995 | Bulfer et al. | 379/201 |
| 5,436,957 | 7/1995 | McConnell | 379/201 |
| 5,440,625 | 8/1995 | Akiyama | 379/199 |
| 5,450,479 | 9/1995 | Alesio et al. | 379/355 |

OTHER PUBLICATIONS

"The Intelligent Network Concept", Jean S Doyle et al. IEEE Communications vol. 36 No. 12, Dec. 1988.
"In Rollout in the United States", Peter A. Russo et al. IEEE Communications pp. 56–56, Mar. 1993.
"A Feature—Interaction Benchmark for IN and Beyond", E Jane Cameron et al. IEEE Communications pp. 64–69, Mar. 1993.

*Primary Examiner*—Fan S. Tsang
*Attorney, Agent, or Firm*—Jones & Askew, LLP

[57] ABSTRACT

The present invention provides for a method of restricting access to authorized users of telephone service from a telephone at a particular location which telephone is accessible by more than one individual. The present invention provides for a method of activating a telephone line by entering a valid access code and deactivating the telephone line by entering a second valid code. Calls may not generally be placed from the telephone when the telephone line deactivated. Calls made from the telephone line after the telephone line has been activated by a valid access code will be attributed to the user associated with the access code. The present invention also provides for a method of routing calls which have been designated as escape codes or priority numbers although the telephone line is in a deactivated state. The present invention also provides a method for activating the telephone line by first entering a logon code followed by an access code which is associated with a user. The access codes may be further used to identify users for which toll calls are not permitted. If an authorized user's access code contains a toll restriction indicator, toll calls attempted by the authorized user when logged in under the user's access code will not be routed.

20 Claims, 8 Drawing Sheets

PRIVATE NETWORK ACCESS

FIG. 9

INTEREXCHANGE CARRIER

MULTI-USER TELEPHONE LINE

This is a continuation of application Ser. No. 08/197,969 filed Feb. 17, 1994, now abandoned.

TECHNICAL FIELD

The present invention relates to the field of switched telephony and in particular to a method of restricting use of telephone service from a telephone which is accessible to more than one person and a method of attributing the use of the telephone service to an authorized user.

BACKGROUND OF THE INVENTION

Businesses commonly have numerous telephones for communicating within their organizations and outside of their organizations. As a result, telephone service is readily accessible to anyone within the reach of a telephone at a business location. Because of the extensive use of telephones and cost associated with toll phone calls, tracking the number of calls made during a time period or tracking the length of each telephone call is advantageous to a company when evaluating the efficiency of the use of its telephone service by its employees at various locations. Also, due to the cost of various levels of telephone service for example, toll or long distance calls, restricting the use of the telephone service at a particular telephone to only employees or certain employees could substantially reduce the cost of telephone service expenses incurred by a company.

Restricting access to telephone service from a telephone at a business location to authorized users is of particular concern to companies or organizations in which members of the general public frequently enter the company's premises. In publicly accessible facilities, it is much harder to monitor or restrict telephone use. This problem is particularly prevalent at public transportation facilities.

At public transportation facilities, for example airports, telephones at some departure and arrival gates are left unattended when none of the airlines at the airport facility have flights due to arrive or depart from the unattended gates. However, members of the public are generally arriving and departing from other nearby gates at the facility. Access to the telephones at the unattended gates is not generally blocked and therefore the general public has access to the telephone service provided by the telephone at the gate. Members of the public could make local calls or toll calls at the expense of the airline to whom the gate is assigned. Similar problems may arise at other public facilities where telephones may be left unattended where members of the public are present.

At public airports, another problem arises when several airlines use the same gate although at different times. When this occurs, the additional problem arises as to which airline should be billed for calls made from the telephone at the shared gate.

Some previous solutions to the problems discussed above have included providing locks for the dial of a rotary dial telephone, removing the telephone when no one was available to attend the telephone, dialing a code each time a telephone use was desired, and attributing calls to various entities sharing the space served by the particular telephone based on a periodic or regular schedule for occupancy of the space served by the particular telephone.

Various problems are encountered when each of the above methods are implemented. With the rotary dial lock, the lock and key must be stored when not being used. A similar storage problem is encountered when a telephone is removed from the telephone jack or line. Dialing a code followed by a telephone number each time the telephone is used can be both time consuming and tedious. Dialing an access code followed by the telephone number is especially tedious when the access code is made long enough to reduce the chances of an unauthorized user from guessing the code. Additionally, apportioning charges on a scheduled basis becomes problematic when an unexpected change in schedule occurs or when an expected change occurs but cannot be conveyed to or updated by the company responsible for apportioning scheduled calls.

Thus, there is a need in the art for a method of restricting use of a telephone service available from a telephone at a particular location which is accessible by more than one person. In connection with such restricted use, there is a need in the art for a method of properly attributing calls made by various users from the same telephone to the appropriate users.

SUMMARY OF THE INVENTION

Generally, the present invention provides for a method of restricting use of a telephone service available from a telephone at a location to which more than one person has access.

The restricted use of the telephone service that is available at a particular telephone is preferably controlled by activating and deactivating the telephone line associated with the telephone. Activating or deactivating connotes calls being permitted or denied on a telephone line, for example, with software, and not in the physical sense wherein no dial tone is provided on the telephone line. A user may activate a telephone line associated with a telephone at a particular location by entering a valid code. Once activated, the user may place the telephone "on hook" then go "off hook" and place subsequent calls without having to enter another code. When the user is through making calls and the telephone is to be left unattended, the telephone line may be deactivated so that no further calls can be made. That is, no further calls may be made until a valid code is entered. The code used for activating a telephone line is preferably associated with a particular user of the limited access service or multi-user service provided by the present invention. The codes may be further defined to provide user specific services selected by the subscriber. By associating a code with a particular user, for example, billing, the type of service, the type of calls that may be permitted, the number of calls and other quantifiable data related to the call may be attributed to the appropriate user. By providing the capability of deactivating the line that was previously associated with a particular user, the user prevents others from placing calls on the telephone which would otherwise be attributed to that user. Also, a telephone line or a plurality of telephone lines may be activated or deactivated by a valid code and telephone line number entered from a second telephone line.

In the preferred method of the present invention, a logon code or number is associated with one or many subscribers and individual access codes are further defined for particular users authorized to use the telephone service. A subscriber is an entity that requests the present invention from the service provider. In order to utilize the preferred method of the present invention, a user will first enter a valid logon code followed by the access code used to identify the particular authorized user. Additionally, the telephone service to which a user may have access may be limited to various levels of telephone service for example, local calls only, toll calls only, or both local and toll calls based upon the access code associated with a particular user. In the preferred embodiment, a second authorized user may enter a logon code and dial an access code, without the initial authorized user having logged off the line, and the subsequent calls will be attributed to the second authorized user.

Although telephone calls may not generally be placed on a deactivated telephone line, the subscriber to the limited access telephone service may specify escape codes or numbers which will have priority to be routed without having to be logged onto the line. Also, a universal telephone company switch based escape code may be provided for all users. For example, the general emergency number "911" may be switched based and routed without having to be logged on to the telephone line.

The present invention also contemplates telephone service in which the telephone service can be activated by entering a valid logon code or a valid logon code and a valid access code associated with a particular user and in which a timer is started after a valid access code has been entered. The timer serves to deactivate the telephone line upon the timer's expiration. The deactivating timer serves to remove the telephone line from service if an authorized user fails to deactivate the line after the authorized user has finished using the service for the intended time period.

The embodiments above are preferably implemented in an advanced intelligent network in which the telephone line is activated for telephone service by collecting a valid logon code or a valid logon code and a valid access code at a service switching point, sending a query message, including the valid codes, to a service control point, evaluating the query message at the service control point and activating the telephone line in response to the query message.

In each of the embodiments summarized above in which the telephone line may be deactivated by the entry of a code, preferably the telephone line is deactivated by sending a second valid code to a service switching point, sending a query message, corresponding to the second valid code, to a service control point, evaluating the query message at the service control point, and deactivating the telephone line in response to the query message.

For each of the methods summarized above, the telephone line may be activated for telephone service to process outbound calls. For the embodiments above in which the telephone service is deactivated by the entering of a second valid code, the telephone line may be deactivated from the currently active service by entering a logon code or logon code and valid access code of a second user. Also, the telephone line may be deactivated from telephone service by entering a log off code. In each of the embodiments the telephone line may be activated for various levels of telephone service for example, local calls, toll calls, toll calls and local calls, private network access, interexchange carrier specification, alternate billing and other functions. Preferably, the telephone line is activated or deactivated by entering a dual tone multifrequency code from the telephone user's key pad.

Therefore, it is an object of the present invention to provide a method of restricting use of telephone service from a telephone which is accessible by more than one person.

It is also an object of the present invention to provide a method of attributing use of telephone service from a telephone accessible to various users to the appropriate user.

It is a further object of the present invention to provide a method of activating and deactivating a telephone line at a location by the entry of valid codes.

It is still another object of the present invention to provide a method of activating a telephone line by the entry of a valid logon code followed by a valid access code.

It is yet another object of the present invention to provide a method for allowing access to a restricted telephone for certain escape codes which may be routed without logging onto the restricted telephone line.

It is yet a further object of the present invention to provide a method for restricting access to a telephone line which may be deactivated by the expiration of a timer.

It is also an object of the present invention to provide a method of restricting the level of telephone service on a multi-user telephone line based on the access code entered.

It is additionally an object of the present invention to provide a method for accessing a private telephone network or public telephone network from a multi-user telephone line.

DETAILED DESCRIPTION OF THE INVENTION

Figure 1:
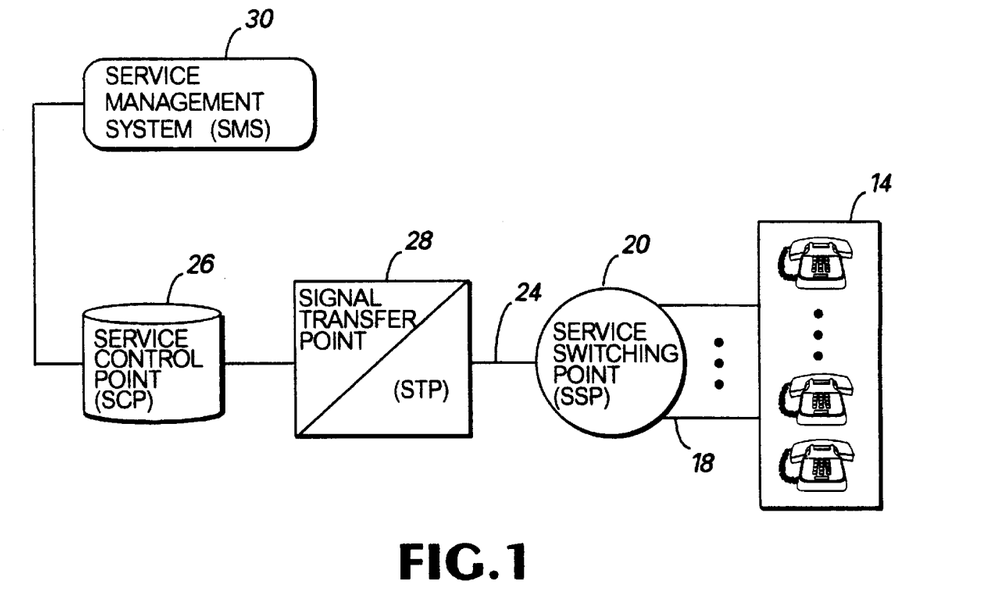
FIG. 1 is a block diagram of an advanced intelligent network used in the preferred embodiment of the present invention.

Turning now to the drawing figures in which like numbers reference like parts or steps, several alternate embodiments of the present invention will now be described. As generally shown in FIG. 1, the present invention is preferably implemented in a modern public, switched telephone network commonly referred to as an Advance Intelligent Network (AIN). Most of the intelligence of the network resides in the components shown in FIG. 1. The present invention contemplates, but it is not limited to, the various embodiments disclosed herein.

FIG. 1 shows a block diagram of the physical devices used in the preferred embodiment of the present invention.

Telephones 14 are connected to service switching point (SSP) 20 via lines 18. Each of the SSP logic nodes at these switches are connected by Signaling System 7 (SS7) data links 24 to a service control point (SCP) 26. A signal transfer point (STP) 28 may be provided between the SSP 20 and SCP 26 along the SS7 data links 24 to serve as an interface between the SSP 20 and the SCP 26. A service management system (SMS) 30 is interfaced with the SCP 26 to provide program instructions and data to the SCP 26.

Currently, these data links are 56 kilobit per second bidirectional data links employing a signaling protocol referred to as SS7. The SS7 protocol is well known to those skilled in the art and is described in a specification promulgated by the American National Standards Institute (ANSI). The SS7 protocol is a layered protocol wherein each layer provides services for layers above it and relies on the layers below to provide it with services. The protocol employs data packets that include the usual beginning and terminating flags and a check bit. Additionally, the data packets also have a signal information field that includes a variable length user specific data and a routing label. A service information octet is included in the data packets and identifies a priority of the message, the national network of the destination of the message, and the user name identifying the entity that created the message. Also, certain control and sequence numbers are included within the data packets, the uses and designations of which are known to those skilled in the art and described in the above referenced ANSI specification.

All of the SS7 data packets from the switches go to a signal transfer point (STP) 28. Those skilled in the art will recognize that signal transfer point 28 is simply a multiport high speed data packet switch that is programmed to respond to the routing information in the appropriate layer of the SS7 protocol, and route the data packet to its intended destination. The signal transfer point is not normally, per se, the destination of a data packet, but merely directs traffic among the other entities on the network that generate and respond to the data packets. It should be noted that signal transfer point devices such as STP 28 are conventionally installed in redundant pairs within the network so that if one device fails, its mate takes over until the first STP is able to return to service. For the sake of simplicity of the drawings, the redundant devices have not been illustrated in the drawing figures in this specification.

Also connected to signal transfer point 28 over SS7 data link 24 is a network access point (NAP) (not shown). Network access point is a computing device programmed to detect trigger conditions. It requires the support of an SSP switch to notify AIN network systems of these trigger detection events. An SSP can support multiple NAP switches. Logically, this SSP is designated as the destination address for many of the data packets generated by the network that would otherwise be routed to the NAP if it were an SSP equipped switch.

Much of the intelligence, and the basis for many of the features of the network, resides in the local service control point 26 that is connected to signal transfer point 28 via SS7 data link 24. As is known to those skilled in the art, service control points are physically implemented by relatively powerful fault tolerant computers. Typical implementation devices may include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate one to twenty seven disk drives ranging from 300 megabytes to 1.2 gigabytes per drive, and have main memory on the order of 24 to 192 megabytes. Thus, it will be appreciated that these are large and powerful computing machines. Among the functions performed by the service control points are maintenance of network data bases used in providing enhanced services. The computers embodying the SCPs can execute at a speed on the order of 17 million instructions per second. Using the SS7 protocol, this translates to about 50 to 100 transactions (query/response pairs) of network messages per second.

Also, service control points include data bases that identify particular service customers. In order to keep the processing of data and calls as simple and generic as possible at switches, such as SSP 20, a relatively small set of triggers are defined at the switches in the call model for each call. A trigger in the network is an event associated with a particular point in the call that generates a data packet to be sent to a service control point. The trigger causes the service control point to query its data base to determine which customized calling feature should be implemented for this particular call. The results of the data base inquiry are sent back to the SSP 20 from SCP 26 through STP 28. The return data packet includes instructions to the SSP 20 as to how to process the call. The instruction may be to take some special action as a result of a customized calling service. In response to receiving the instruction, the switch will move through its call states, and generate further data packets that will be used to set up and route the call, as described hereinabove.

The SCP 26 includes a database and a computer which has program instructions for executing certain steps of the preferred embodiment described herein below. Whether a telephone line is activated or deactivated depends on the information contained in the data packets passed along the network.

The SCP 26 is the host for the feature logic and service data. Using the subscription data in conjunction with the multi-user feature logic, discussed below, allows the SCP 26 to activate a telephone line for a particular subscriber. Individual user parameters may be integrated in the present invention by use of various known programming tools including Decision Graphs (DG). Decisions Graphs are programming tools developed by American Telephone and Telegraph (AT&T) and known to those skilled in the art. Other programming tools, known to those skilled in the art, are available which may be used to implement the various embodiments of the present invention. For example, service logic language available from AT&T may also be used.

In order to implement the present invention, the subscriber indicates the set of lines to which the present invention should be applied. If the subscriber is adding the multi-user telephone line service to existing individual lines, then the directory number for those lines is used. If the subscriber is obtaining new individual lines in conjunction with the present invention, then the new numbers of those individual lines are used. If the subscriber is using individual lines, then each directory number will be provisioned with an off-hook delay trigger as known to those skilled in the art.

Electronic Switching System Exchange (ESSX) group telephone lines may be used with the present invention. By using ESSX lines, a subscriber may implement independent dialing plans (IDP), such as abbreviated dialing plans utilizing a four digit pattern. ESSX lines are sometimes used in conjunction with private network arrangements and are typically less expensive than using single business telephone lines.

If the subscriber is adding the present invention to an existing ESSX, the ESSX group's identifier is provided by the subscriber. If the subscriber is obtaining a new ESSX group, then the new ESSX group identifier is used. Definition of the dialing plan for an ESSX group must associate an IDP access code trigger with all dialing patterns resulting in calls that are subject to this service. Specifically, the configuration of the present invention for an ESSX group will use an IDP access code trigger. This is accomplished in the dialing plan by defining initially dialed numbers as requiring digit manipulation as known to those skilled in the art. This in turn allows the dialing plan to prepend the dialed number with additional digits. A subsequent pass of the modified number through the dialing plan will recognize the prepended digits as a signal to query the SCP. In the query, the prepended digits will be stripped from the dialed number and the original dialed digits will be passed in the query.

The use of the telephone service that is available to the limited access telephones 14 is preferably controlled by activating and deactivating the telephone lines connected to the telephones 14. Activating or deactivating connotes calls being permitted or denied on a telephone line, for example, with software, and not in the physical sense wherein no dial tone is provided on the telephone line.

A user may activate a phone line associated with a telephone 14 by entering the appropriate logon code or logon code and access code from a telephone 14. Once activated, the user may place the telephone "on hook" then go "off hook" and place subsequent calls without having to enter another code. When the user is through making calls, the telephone line may be deactivated so that no further calls can be made. That is, no further calls may be made until a valid code is entered. The access code used in connection with activating a telephone line are preferably associated with a particular user to the limited access service and the access code may be further defined to provide user specific services selected by the subscriber. By associating an access code with a particular user, billing, the type of service, the type of calls that may be permitted, the number of calls and other quantifiable data related to the call may be associated with the appropriate user. By deactivating the line that was previously associated with a particular user, the user prevents others from placing calls on the telephone line which would otherwise be attributed to the user.

In the preferred method of the present invention, a logon code or number is associated with a subscriber and individual access codes are further defined for individuals authorized to use the telephone service available to the user at the particular telephone 14. In order to utilize the preferred method of the present invention, a user first enters a valid logon code followed by the access code used to identify the particular authorized user. Additionally, the telephone service to which a user may access may be limited to various levels of telephone service including for example, local calls only, toll calls only, or both local and toll calls based upon the access code associated with a particular user. If a user, for example, associated with Company A, logs on a telephone line and enters a valid access code, all calls made after entering the access code and prior to the entering of another valid code will be attributed to that user. If a second user, also associated with Company A or Company B, desires to use the telephone service of Company A or Company B, respectively but have those calls attributed to the second user, then the second user may enter a logon code and a valid access code without entering a designated logoff code. All subsequent calls will be attributed to the second user until another valid access code is entered or a valid logoff code has been entered. The present invention contemplates that the logon code may be the same for all users or various users may have different logon codes.

As part of the present invention, the service provider issues logon codes and the subscriber supplies a list of access codes that will authorize subsequent use of the phone line. Each code preferably should be a string of digits with a length of at least 1 but no more than 15 digits. All codes preferably should be of equal length. Also, logon and logoff codes must be established that the end user can dial to perform those functions. These numbers do not have triggers, but should be selected so as not to conflict with possible dialed numbers.

Figure 2:
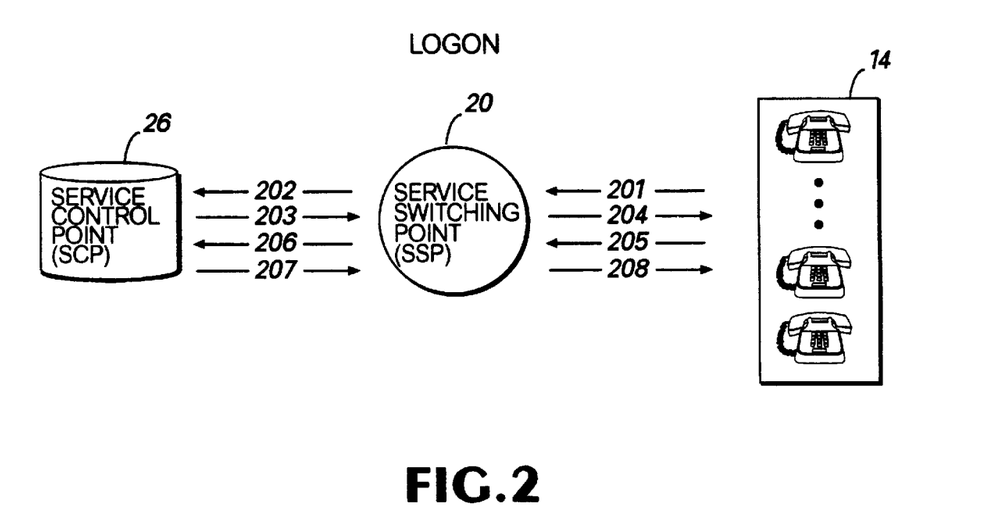
FIG. 2 is a block diagram illustrating the logon procedures utilized in the preferred embodiment of the present invention.

Referring to FIG. 2, a block diagram illustrating the logon protocol of the preferred embodiment of the present invention is shown. At step 201, the user goes off-hook and dials a designated logon code. Based on the dialed digits and trigger definition, at step 202 the SSP 20 launches a query message to the SCP 26. The query message includes the identity of the line on which the call originated and the digits dialed on that line. At step 203, the SCP 26 recognizes the query as a request to logon based on the logon code and directs the SSP 20 to play an announcement and collect digits for an access code. At step 204, the SSP 20 plays the announcement to the user requesting the input of the access code. The input of the access code is preferably dual tone multifrequency (DTMF) signals. The user inputs an access code at step 205. At step 206, the SSP 20 returns the access code to the SCP 26. At step 207, if the access code is valid, the SCP 26 marks the originating line as active for the subscriber associated with the access code. As discussed above, any information associated with the following features may be saved for use on subsequent calls: interexchange carrier selection, alternate billing, toll restriction, private facility access, and an audit trail of calls. Also, at step 207, the SCP 26 sends a response to the SSP 20 directing it to play a terminating announcement confirming the logon. However, if the access code is invalid, the SCP 26 sends a response to the SSP 20 directing it to play a terminating announcement indicating that the logon was unsuccessful. At step 208, the SSP 20 plays the announcement to the user and terminates the call.

Figure 3:
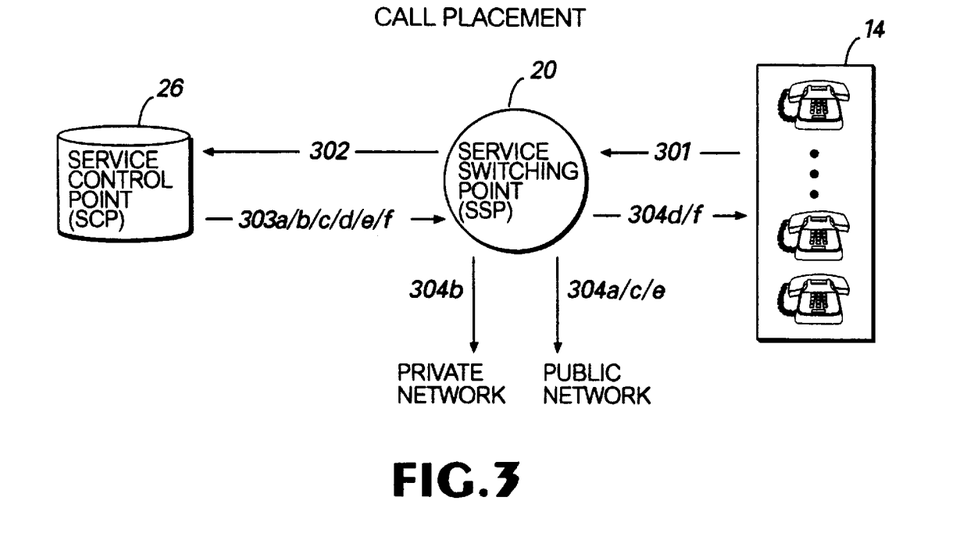
FIG. 3 is a block diagram illustrating the procedures of making calls in the preferred embodiment of the present invention.

Referring to FIG. 3, a block diagram illustrating the call placement protocol of the preferred embodiment of the present invention is shown. At step 301, the user goes off-hook and dials in accordance with the dialing plan in force on the line. At step 302, the SSP 20 is triggered and the SSP 20 launches a query to the SCP 26. If "911" is dialed, the call is routed and no AIN messages are generated. The "911" number is a telephone company universal switch based escape code in which no query is made to the SCP 26. Other switch based escape codes may be defined by the operating telephone company.

At step 303a if the escape code feature is used and the dialed number corresponds to an escape code, the SCP 26 instructs the SSP 20 to route the call as indicated at step 304a. At step 303b if the line is logged on, the private facility access feature is used, and the dialed digits indicate a request for private facility access, then the SCP 26 instructs the SSP 20 to route the call, as indicated at step 304b, to a trunk group associated with the logged on user. At step 303c, if the line is logged on, the call level restriction feature used, the line is authorized for level 2 calls, and it is a level 2 call, then at step 303c the SCP 26 retrieves any information related to the following features: the interexchange carrier selection, alternate billing, and audit trail. Using this information, the SCP 26 instructs the SSP 20 to connect the call as indicated at step 304*c*. At step 303*d*, if the line is logged on and the call level restriction feature is used and a call is placed which is not authorized for level 2 calls, then the SCP 26 instructs the SSP 20 to play a terminating announcement as indicated at step 304*d*. At step 304*d*, the SSP 20 also plays an announcement indicating that the access code is invalid for a particular level of telephone service such as a toll call. At step 303*e* if the line is logged on and the call level restriction feature is not used then the SCP 26 retrieves any information related to the following features: interexchange carrier selection, alternate billing, and audit trail. Using this information, the SCP 26 instructs the SSP 20 to connect the call as indicated at step 304*e*. At step 303*f*, if none of the prior circumstance discussed in 303*a–e* apply and the escape code feature is not used or, if used, an escape code was not dialed, then the SCP 26 instructs the SSP 20 to play a terminating announcement as indicated at step 304*f*. At step 304*f*, the SSP also plays an announcement which indicates that the line is not logged on.

Figure 4:
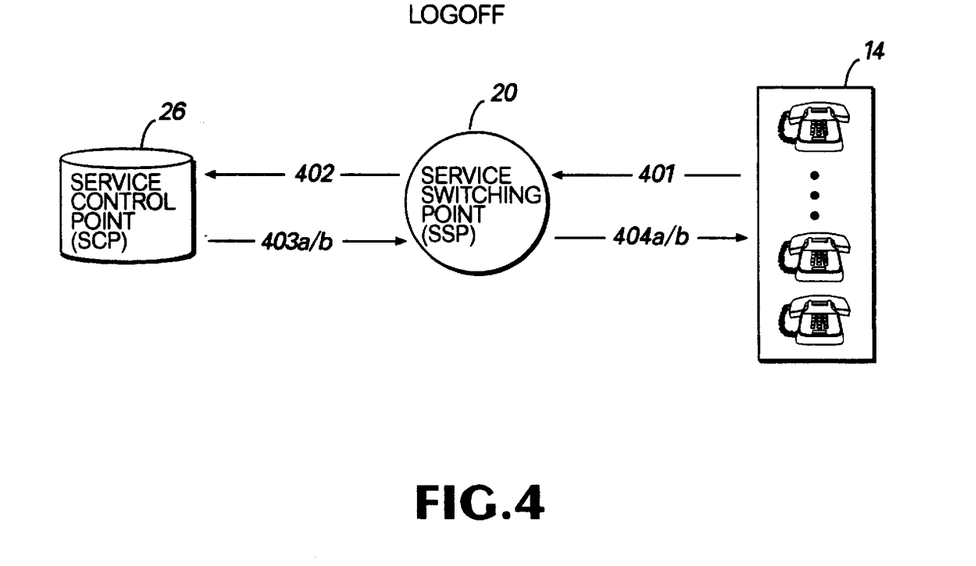
FIG. 4 is a block diagram of the logoff procedures used in the preferred embodiment of the present invention.

Referring to FIG. 4, a block diagram illustrating the logoff protocol of the preferred embodiment of the present invention is shown. At step 401, the user goes off-hook and dials a designated logoff code. At step 402 the SSP 20 launches a query to the SCP 26 containing the dialed log off code. At step 403*a*, the SCP 26 recognizes this as a logoff request. The line number of the originating line is checked to see if it is currently logged on. If so the originating line number is changed to be in a logged out state and any information maintained in conjunction with the following features is deleted: interexchange carrier selection, alternate billing, toll restriction, private facility access, and audit trail. A response is sent to the SSP 20 directing it to play a terminating announcement confirming the log off as indicated at step 404*a*. However if the line is not logged on, at step 403*b* a response is sent to the SSP 20 directing it to play a terminating announcement indicating that the calling number is not currently logged on as indicated at step 404*b*.

Figure 5:
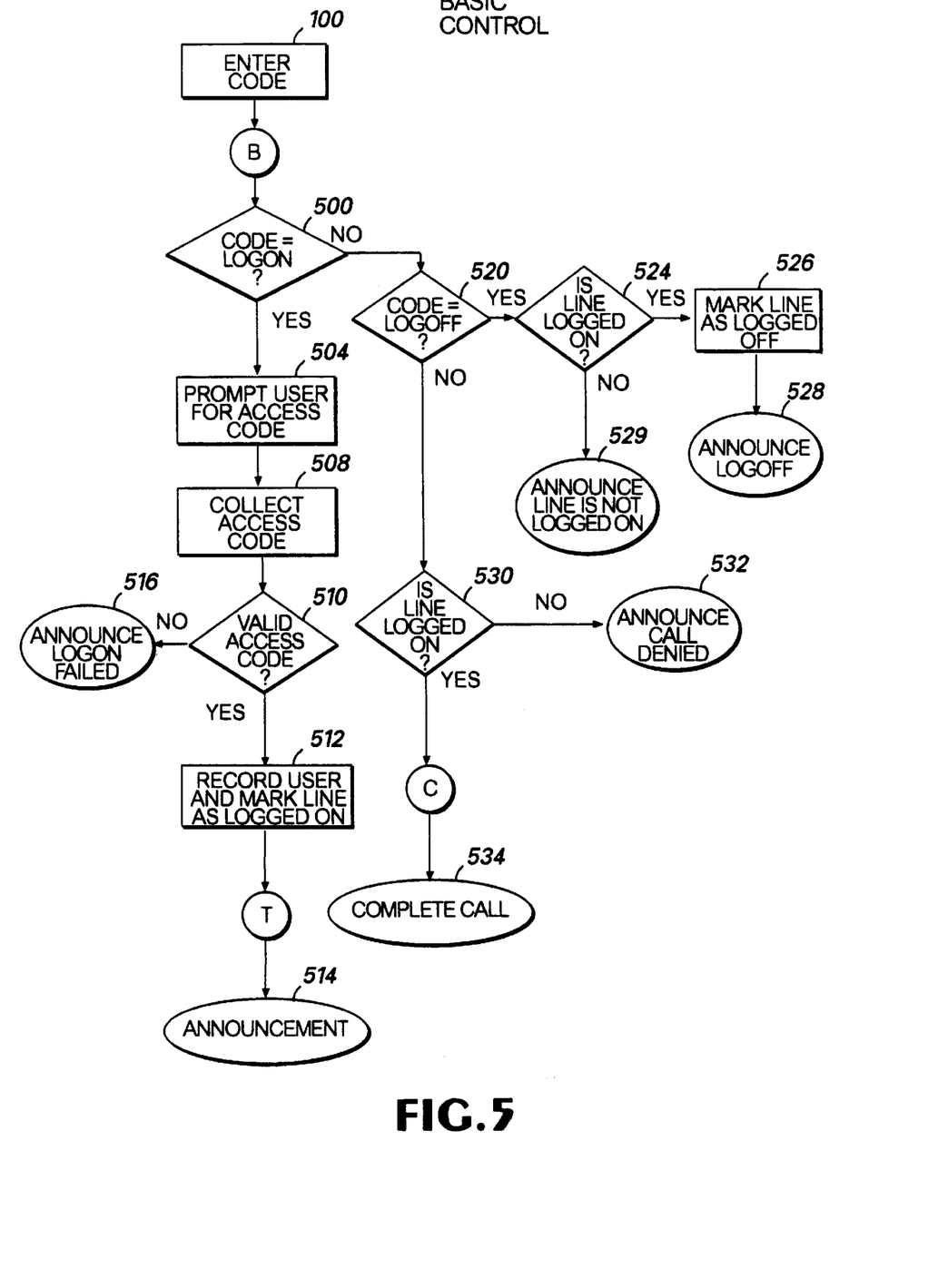
FIG. 5 is a flow diagram of the logic implemented in the present invention.

Referring to FIG. 5, a general flow diagram illustrating the logic of an embodiment of the present invention is shown. When a user goes off hook on a deactivated telephone line of a telephone 14 the user enters a code as indicated at step 100. The code entered at step 100 is evaluated by the SCP 26 at step 500 to determine whether the code entered is a valid logon code. If the code is a valid logon code then the SCP 26 instructs the SSP 20 to prompt the user for an access code at step 504. At step 508, the SSP 20 collects the access code entered for evaluation at the SCP 26. The access code is evaluated by the SCP 26, at step 510, to determine whether or not the access code is valid.

If the access code is valid then the user associated with the access code is recorded and the line is marked logged on by the SCP 26 at step 512 so that subsequent calls may be attributed to the user. At step 514, the telephone is authorized for service so that the user may now place outbound calls and an announcement is played confirming logon. If, however, at step 510 the user entered an invalid access code then at step 516 the SCP 26 instructs the SSP 20 to play an announcement indicating that the access code entered by the user was invalid and that telephone service has not been established at this particular location.

If the user enters a non-logon code at step 100 then at step 500 the logic proceeds to step 520. At step 520, the code entered will be evaluated by the SCP 26 to determine whether or not the code is a logoff code. If the code is a logoff code then at step 524 the SCP 26 checks the line to determine whether or not it has been logged on. If the line has been logged on then at step 526, the SCP 26 will mark the line as logged off and at step 528 the SCP 26 instructs the SSP 20 to play an announcement indicating that the telephone line has been logged off. If, however, at step 524 the line is not logged on then at step 529 an announcement will be played indicating that a logoff code is inappropriate as the line is not logged on.

If at step 520 the code entered is not a logoff code then at step 530 the SCP 26 determines whether the line is logged on. If the line has not been logged on then, at step 532, the SCP 26 instructs the SSP 20 to play an announcement indicating that the call is denied. However, at step 530, if it is determined that the line is logged on then, at step 534, if the subscriber has not subscribed to alternate embodiments, the call will be directed as dialed. However, the embodiments shown in FIGS. 7–13 may be further configured with the embodiment of FIG. 5. Steps B, C and T of FIG. 5 are carried out only as alternate embodiments of the embodiment illustrated in FIG. 5 and is not basic to the embodiment of FIG. 5.

Figure 6:
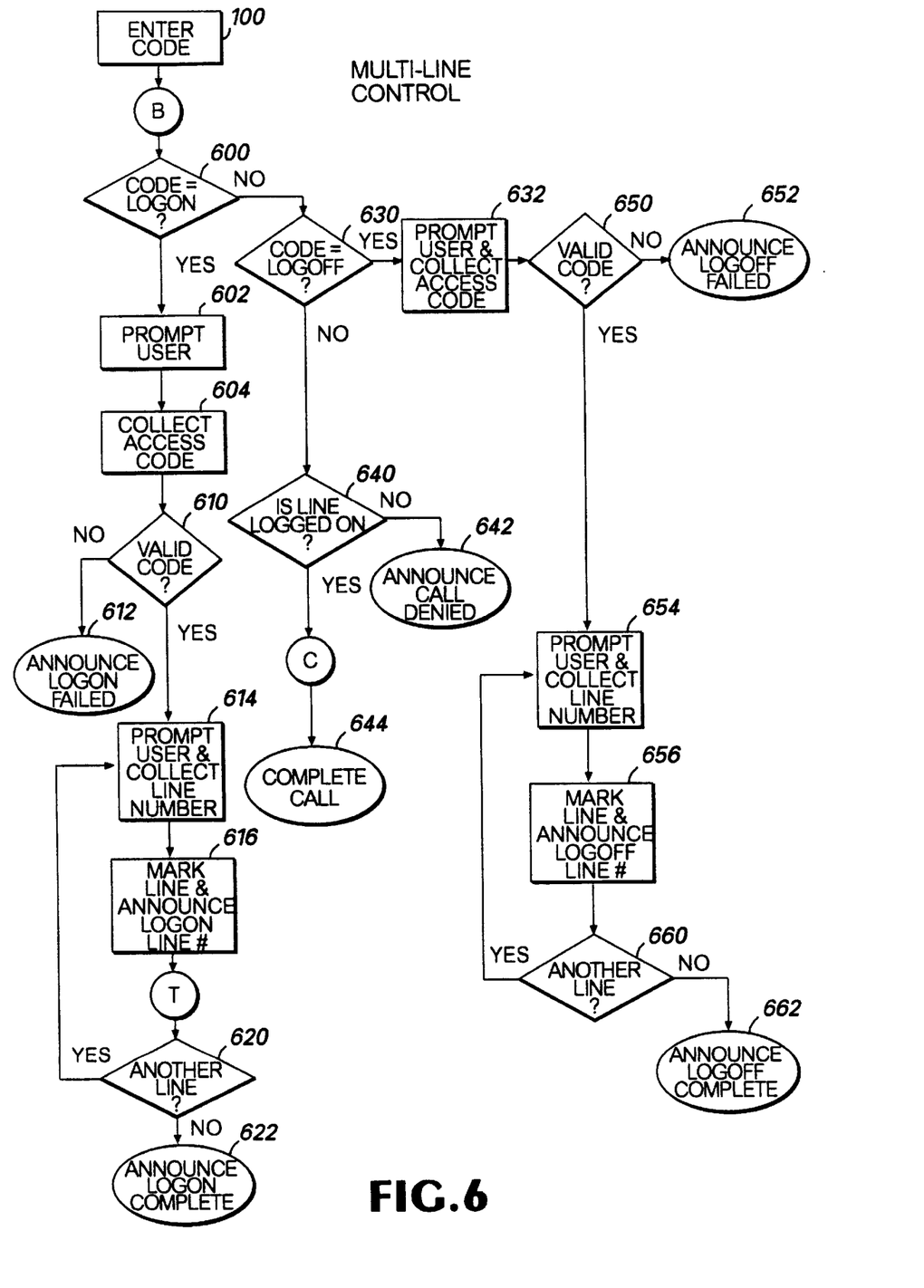
FIG. 6 is a flow diagram of the logic implemented in an alternate embodiment of the present invention.

Referring to FIG. 6, a general flow diagram of an alternate embodiment of the present invention is shown. In the embodiment of FIG. 6, a user may logon to multiple telephone lines from a line other than the line from which the user inputs the logon and access code by specifying a number or numbers assigned to the line or lines in which the user desires to logon. When a user goes off-hook on a deactivated telephone line of a telephone 14 the user must enter a code as indicated at step 100. The code entered at step 100 is evaluated by the SCP 26 at step 600 to determine whether the code entered is a valid logon code. If the code is a valid logon code then the SCP 26 instructs the SSP 20 to prompt the user for an access code at step 602 and to collect the access code at step 604. At step 610, the SCP 26 determines whether or not the access code is valid.

If the access code is not valid then at step 612 the SSP 20 will announce that the logon has failed. However, if the access code is valid then at step 614 the SCP 26 instructs the SSP 20 to prompt the user for the line number that the user wishes to logon and to collect the line number entered. At step 616, the SCP 26 marks the line as logged on and instructs the SSP 20 to announce which line number is logged on. At step 620, the SCP 26 instructs the SSP 20 to ask the user if the user desires to log on to another line. If the user enters a "no" response or does not respond at all then at step 622 the SSP announces that logon has been completed. However, if at step 620, the user enters a "yes" response then steps 614, 616 and 620 are repeated as discussed above.

If the user enters, at step 600, a non-logon code at step 100 then, at step 630, the code entered will be evaluated by the SCP 26 to determine whether or not the code is a logoff code. If, at step 630, the code is a logoff code then at step 632 the SCP 26 instructs the SSP 20 to prompt the user to enter the user's access code and to collect the access code. At step 650, the SCP 26 determines whether or not the access code entered is valid. If the access code is not valid then at step 652 the SCP instructs the SSP to announce that logoff has failed. However, if the access code is valid then at step 654 the SCP 26 instructs the SSP 20 to prompt the user for the line number that the user wishes to logoff and to collect the line number entered. At step 656, the SCP 26 marks the line as logged off and instructs the SSP 20 to announce which line number is logged off. At step 660, the SCP 26 instructs the SSP 20 to ask the user if the user desires to log off to another line. If the user enters a "no" response or does not respond at all then at step 662 the SSP announces that logoff has been completed. However, if at step 660, the user enters a "yes" response then steps 654, 656 and 660 are repeated as discussed above.

If at step 630 the code is not a logoff code then the SCP 26 determines whether or not the line is logged on at step 640. If the line is not logged on then the SCP 26 instructs the SSP to announce that the call is denied at step 642. However, at step 640, if it is determined that the line is logged on, at step 644, if the subscriber has not subscribed to alternate embodiments, the call will directed as dialed. However, the embodiments shown in FIG. 7–13 may be further configured with the embodiment of FIG. 6. Steps B, C and T of FIG. 6 are carried out only as alternate embodiments of embodiment illustrated in FIG. 6 and are not basic to the embodiment of FIG. 6.

Figures 7, 8:
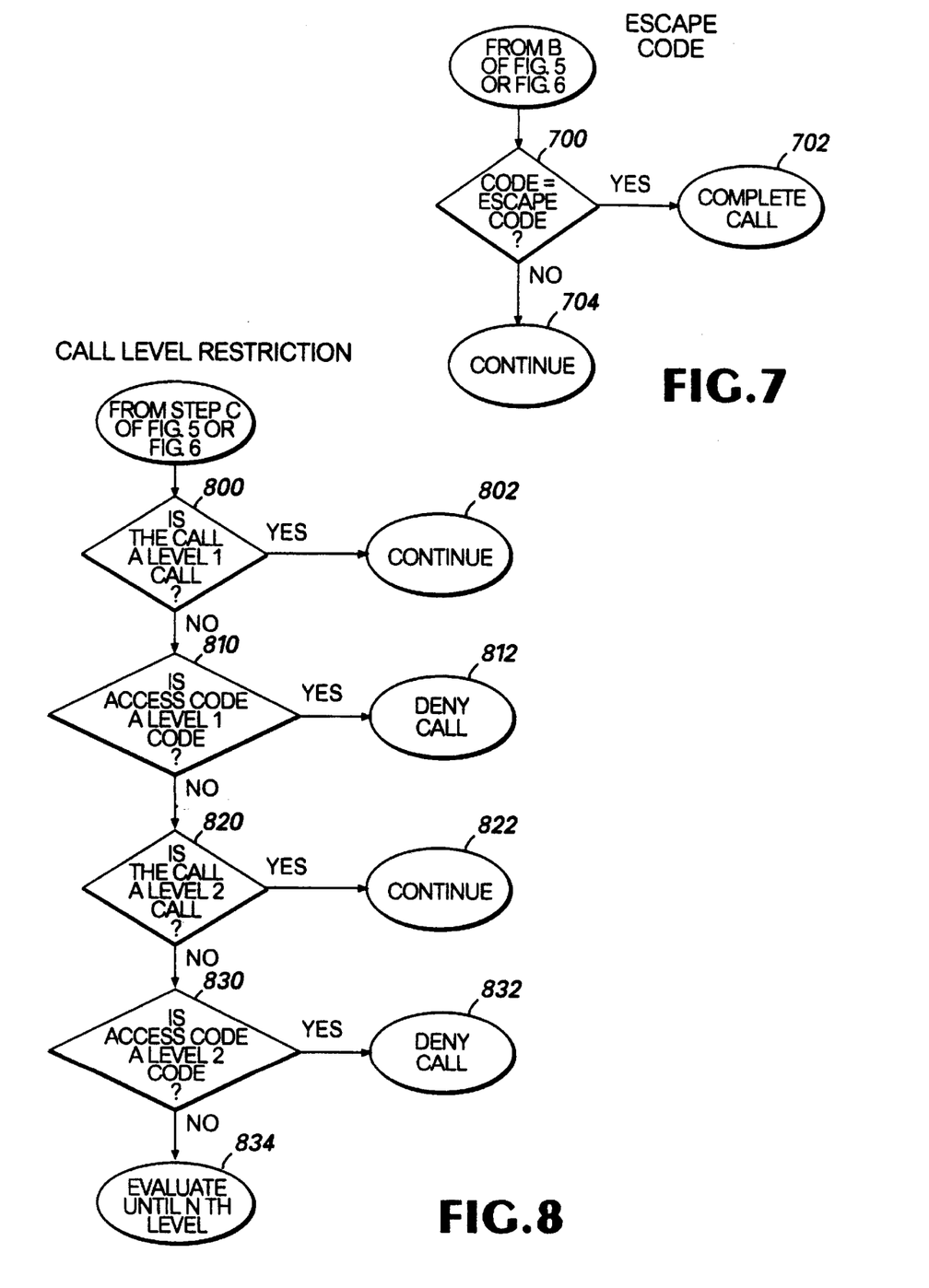
FIG. 7 is a flow diagram of the logic implemented in another alternate embodiment of the present invention.
FIG. 8 is a flow diagram of the logic implemented in another alternate embodiment of the present invention.

Referring to FIG. 7, a flow diagram illustrating the logic of an alternate embodiment of the present invention is shown. The logic for the embodiment of FIG. 5 or FIG. 6 may be adapted to permit calls made to predetermined numbers to be completed without having to logon to the telephone line. Generally, these escape telephone codes can be permitted to emergency services at the facility, to public emergency services or to frequently dialed local numbers. Escape codes or escape numbers may be defined as any code the user chooses but the escape code activates or routes the call only for that particular dialed number and the line is not activated for subsequent use. When a code is entered at step 100, the code is evaluated by the SCP 26, at step 700, to determine whether or not the code is a escape code. If, at step 700, the code is determined by the SCP 26 to be an escape code then the SCP 26 instructs the SSP 20 to route the call as dialed at step 702. However, if, at step 700, the code entered is not an escape code then, at step 704, the code is evaluated as previously discussed and illustrated according to the logic diagrammed in FIG. 5 or FIG. 6.

In some cases, subscribers may wish to designate large blocks of numbers or particular dialing patterns as escape codes. If codes that can be completed without logging on can be identified by some substring of the dialed digits, the code can be compared to database entries with only a substring of the dialed digits. If the escape code service is configured on ESSX lines, the dialing plan on those lines may be defined so as to avoid queries to the SCP 26 when an escape code is entered.

Referring to FIG. 8, the flow diagram illustrating the logic of an alternate embodiment of the present invention is shown. The embodiment illustrated in FIG. 8 may be referred to as a level of service or call level restriction embodiment. A subscriber may elect to choose a level of service restriction for selected access codes of users of that subscriber's telephone service. If the call level restriction option is utilized then the subscriber may provide a list of access codes for which only a certain level or levels of calls will be permitted. For example, if an access code has been entered for which a level 2 restriction has been implemented (e.g. a toll restriction) and a level 2 call is attempted, the call will not be completed as dialed. The diagram of FIG. 8 may be implemented in conjunction with the flow diagrams of either FIG. 5 or FIG. 6 with step 800 replacing step C of FIG. 5 or FIG. 6. At step 800, the SCP 26 evaluates the call to determine whether or not the call is a level 1 call. If the call is a level 1 call then the call is completed by the SSP 20 as dialed at step 802. If, however, the call is a level 2 or higher level call then at step 810, the SCP 26 determines whether the access code entered is a level 1 access code. If the access code is a level 1 access code then the call will be denied as indicated at step 812. However, if, at step 810, the access code is a level 2 or higher access code then at step 820 the call is evaluated to determine whether the call is a level 2 call. If the call is a level 2 call then, at step 822, the call is continued as previously discussed and illustrated according to the logic diagram in FIG. 5 or FIG. 6. However, if, at step 820, the call is a level 3 or higher call then at 830, the access code is evaluated to determine whether the access code is a level 2 access code. If the code is a level 2 access code then at step 832, the call will be denied. If, at step 830 the access code is higher than a level 2 access code, the call will be continued or further evaluated, as indicated at step 834, through n levels of services where n represents the number of different levels of service that a subscriber has chosen.

If the call level restriction option is used, the subscriber supplies a call level restriction indication for each code used. For each code, the call level restriction indicator will be saved during logon procedures. The call level restriction indicator resulting from the code is associated with the state of the line. The value "0" preferably is used to indicate that call level restriction is not active when this code is logged on. A value of "1" preferably is used to indicate that call level restriction is active when the code is logged in.

Figure 9:
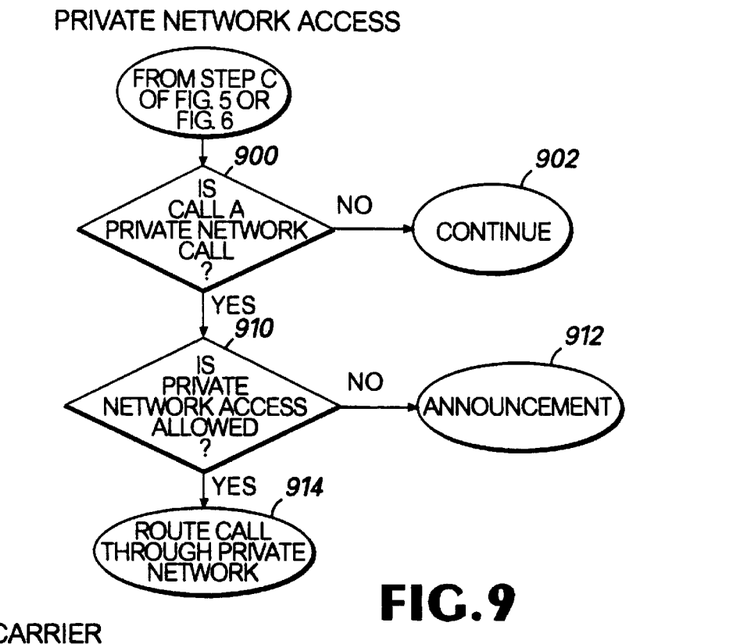
FIG. 9 is a flow diagram of the logic implemented in another alternate embodiment of the present invention.

Another option available to a subscriber is illustrated in the flow diagram of FIG. 9. For some subscribers, some users associated with the subscriber will require access to a private network. The logic illustrated in FIG. 9 provides for an access code to be associated with an identifier which indicates whether or not the public switch network is to be accessed or the private telephone network is to be accessed. The embodiment illustrated in FIG. 9 may be implemented with either the embodiment of FIG. 5 or FIG. 6 with step 900 replacing step C of FIG. 5 or FIG. 6. If, at step 900, the call is not identified as a private network call then the call is continued or completed through the public switched telephone network at step 902. If, however, the call is identified at step 900 as a private network call then, at step 910, the SCP 26 determines whether the access code is valid for private network calls. If the code is not valid for private network calls then, at step 912, a terminating announcement is played. If, at step 910, the access code is valid for private network calls then the call is routed through the private network at step 914.

If the private facility access option is used, the subscriber will authorize a route index (or trunk group number) to be associated with users. If not all users have access to a private facility, then a null value is used. The subscriber should indicate which leading digit will designate access to the public switched network. This is incorporated into the independent dial plan defined for the ESSX.

Figure 10:
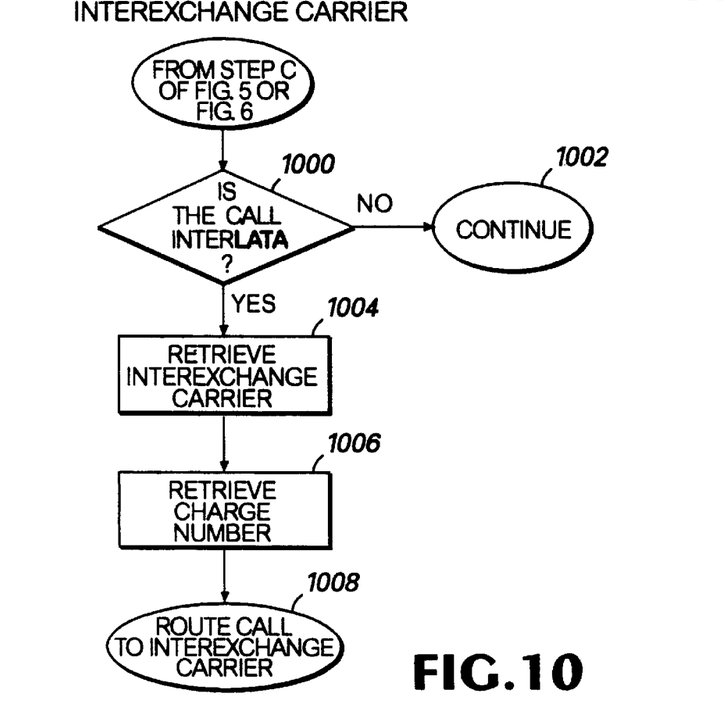
FIG. 10 is a flow diagram of the logic implemented in another alternate embodiment of the present invention.

Another embodiment of the present invention is illustrated in FIG. 10 which is adapted to permit the subscriber to designate an interexchange carrier for interLATA calls for each user. The diagram of FIG. 10 may be implemented with the diagrams of either FIG. 5 or FIG. 6 with step 1000 of FIG. 10 replacing step C of FIG. 5 or FIG. 6. At step 1000, the SCP 26 evaluates the call to determine whether the call is an interLATA call. If the call is not an interLATA call then the call is continued or completed as dialed. If, however, at step 1000 the call is determined to be an interLATA call then, at step 1004, the interexchange carrier designated by the subscriber is retrieved by the SCP 26. At step 1006, the charge number of the user is retrieved, then the call is routed to the interexchange carrier designated by the subscriber at step 1008.

Figure 11:
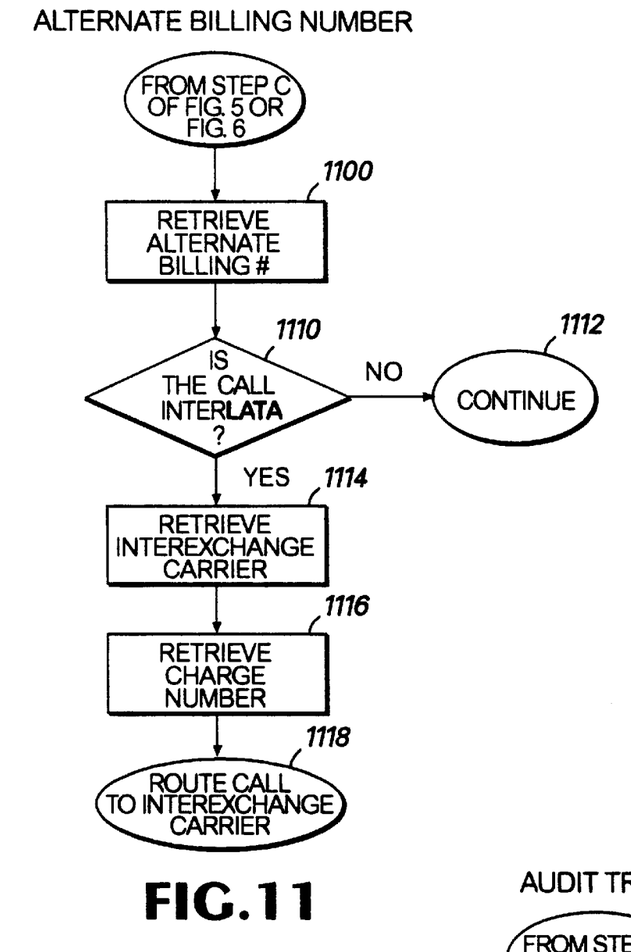
FIG. 11 is a flow diagram of the logic implemented in another alternate embodiment of the present invention.

Referring to FIG. 11, a flow diagram illustrating the logic of another embodiment of the present invention is shown in which an alternate billing number may be used. The embodiment in FIG. 11 may be implemented with the logic illustrated in either FIG. 5 or 6 with step 1100 replacing step C of either FIG. 5 or 6. At step 1100, the alternate billing number for the user is retrieved by the SCP 26. At step 1110, the SCP 26 determines whether the call is interLATA. If the call is not interLATA then at step 11 12 the call is continued or completed. However, if at step 1110, the call is determined to be interLATA then, at step 1114, the interexchange carrier is retrieved by the SCP 26. At step 1116, the charge number of the user is retrieved and then the call is routed to the interexchange carrier at step 1118. The embodiment of FIG. 11 permits a subscriber to designate an alternate billing number for calls for each user made when logged under the user's access code. If an alternate billing number is not used, the line on which the call originated will be used for billing purposes.

Figure 12:
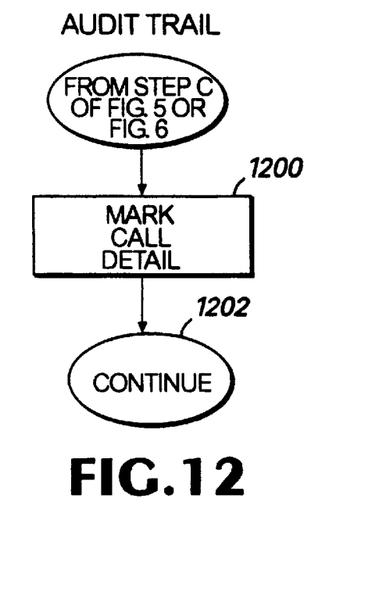
FIG. 12 is flow diagram of the logic implemented in another alternate embodiment of the present invention.

Referring to FIG. 12, a flow diagram illustrating the logic of another embodiment of the present invention is shown. The embodiment of FIG. 12 provides for recording data related to each call and therefore provides an audit trail for calls. The embodiment of FIG. 12 may be implemented with the logic illustrated in either FIG. 5 or FIG. 6 with step 1200 replacing step C of either FIG. 5 or 6. At step 1200, the SCP marks the call detail for each call placed. The call detail may include, for example, the line number on which the call was placed, the dialed digits, the time of the call, or the identification of the caller. At step 1202, the call is continued or completed.

Figure 13:
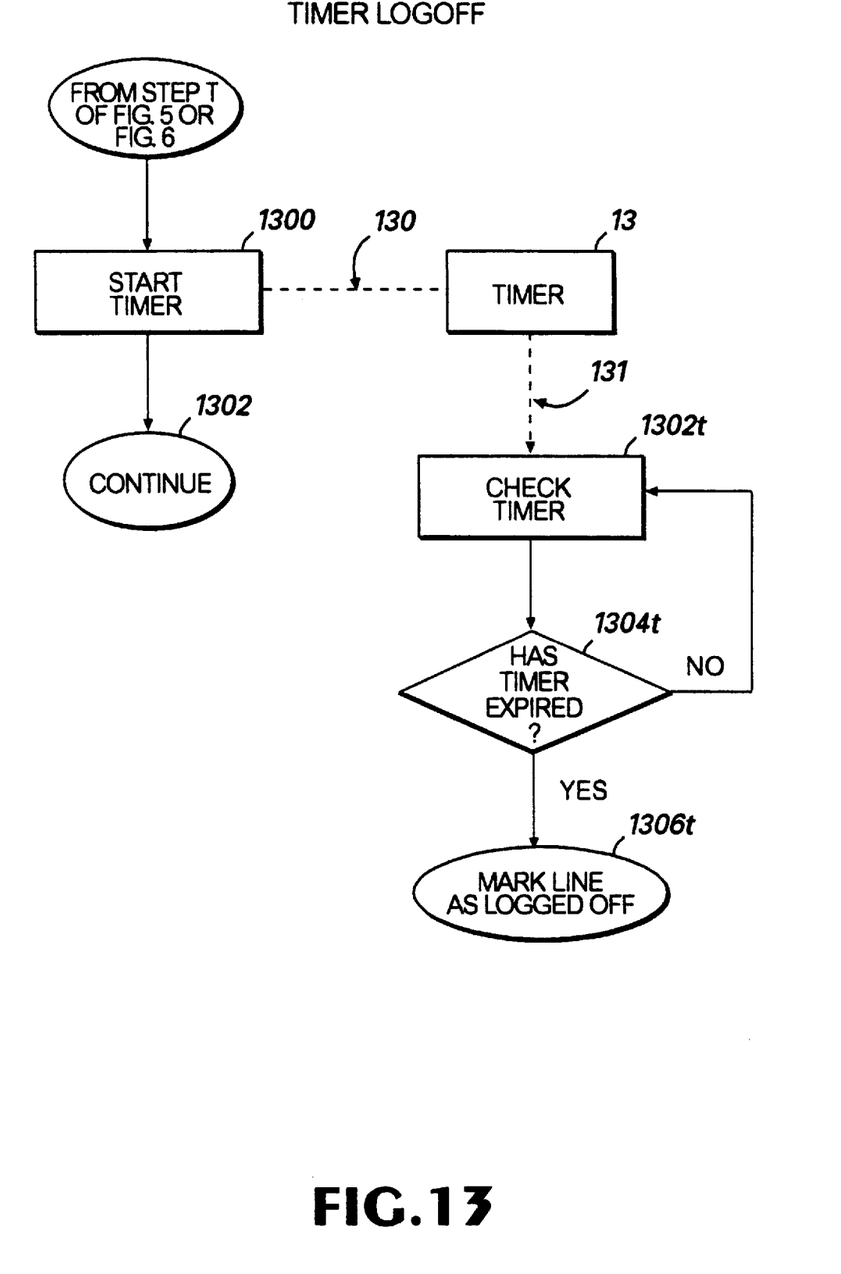
FIG. 13 is flow diagram of the logic implemented in another alternate embodiment of the present invention.

Referring to FIG. 13, a flow diagram illustrates the logic of another embodiment of the present invention in which a timer is started after a logon code has been entered to provide for automatic logoff after a predetermined time. The embodiment of FIG. 13 may be implemented with the logic illustrated in either FIG. 5 or FIG. 6 with step 1300 replacing step T of either FIG. 5 or 6. At step 1300, a timer 13 is started at the SCP then the call is continued or completed at step 1302. The time is measured with respect to an internal clock at the SCP. The timer is started via a line 130. The timer may be set to expire for example after two hours. When the timer expires, the line is logged off.

At step 1302t the timer is checked via a line 131. At step 1304t, a determination is made as to whether the timer has expired. If the timer has not expired then the timer is once again checked at step 1302t. However, if the timer has expired then at step 1306t the line is marked as logged off. It should be appreciated that once the timer 13 has been started it is continuously monitored until the line has been logged off.

It should be appreciated by those skilled in the art that the embodiments of FIGS. 7–13 may be combined in numerous ways with the embodiment of FIG. 5 or FIG. 6 other than the ways illustrated. For example, the logic diagrammed in FIG. 6 may be combined with the logic diagrammed in FIGS. 7–13 to form a fully implemented system with multiple subscriber options. Many adaptations, combinations, and modifications of the features described above are possible as known to those skilled in the art.

The foregoing relates to the preferred embodiment of the present invention, and many changes may be made therein without departing from the scope of the invention as defined by the following claims.

We claim:

1. In an intelligent switched telephone network, having selected telephone lines connected to a plurality of particular locations, a method of restricting use of a telephone service from at least one of said selected telephone lines at a particular location, comprising the steps of:

activating a telephone line for a first level of service of a plurality of levels of service and associating said telephone line with a particular user for subsequent calls associated with said telephone service at said particular location when a valid code at said particular location has been entered, said valid code comprising a first logon code followed by a first valid access code; and deactivating said telephone line from said telephone service at said particular location when a second logon code at said particular location has been entered.

2. The method of claim 1 wherein said first level of service comprises local calls and wherein said step of activating said telephone line for said first level of service comprises activating said telephone line for said local calls.

3. The method of claim 1 wherein said step of activating said telephone line further comprises activating said telephone line for said first level of service and a second level of service.

4. The method of claim 3 wherein said second level of service comprises toll calls and wherein said step of activating said telephone line for said first level of service and said second level of service comprises activating said telephone line for said toll calls.

5. The method of claim 3 further comprising the step of denying a call when said call requires said second level of service and said telephone line has been activated only for said first level of service.

6. The method of claim 5 wherein said first level of service comprises local calls and wherein said step of denying said call comprises denying a toll call when said telephone line has been activated only for aid local calls.

7. In an intelligent switched telephone network, having selected telephone lines connected to a plurality of particular locations, a method of restricting use of a telephone service from at least one of said selected telephone lines at a particular location, comprising the steps of:

activating a telephone line for a plurality of levels of service and associating said telephone line with a particular user for subsequent calls associated with said telephone service at said particular location when a valid code at said particular location has been entered, said valid code comprising a first logon code followed by a first valid access code; and deactivating said telephone line from said telephone service at said particular location when a second logon code at said particular location has been entered.

8. The method of claim 7 further comprising the step of denying a call when said call requires a level of service for which said telephone line has not been activated.

9. In an intelligent switched telephone network, having selected telephone lines connected to a plurality of particular locations, a method of restricting use of a telephone service from a telephone line at a particular location, comprising the steps of:

receiving a first valid logon code from a user from one of said particular locations;

activating said telephone line associated with said telephone service for said user for subsequent calls at one of said particular locations in response to said step of receiving said first valid logon code; and deactivating said telephone line in response to receiving a second valid logon code said second valid logon code, representing a telephone line activation code of another user, receipt of said second valid logon code causing deactivation of association of said telephone line with said telephone service for said user and said telephone line being activated and associated with said telephone service for said another user.

10. The method of claim 9 wherein said first valid logon code is the same as said second valid logo code and wherein said step of deactivating said telephone line comprises deactivating said telephone line without activating or associating said telephone line with said another use response to receiving said second valid logon code.

11. A method of restricting the use of telephone service, with exception of provision of said telephone service in response to entry of an escape code, at a particular location to one of a plurality of subscribers, comprising the steps of:

dedicating said use of said telephone service, with said exception of provision of said telephone service in response to entry of said escape code, to said plurality of subscribers, each of said plurality of subscribers having obtained an advanced subscription so as to receive said telephone service at said particular location in response to input of a valid logon code on a telephone line associated with said particular location;

receiving a code;

checking whether said code corresponds to said valid logon code of one of said plurality of subscribers;

if said valid logon code is received, then activating said telephone line for subsequent calls associated with said telephone service at said particular location; and deactivating said telephone line for said telephone service at said particular location in response to receiving a second logon code.

12. The method of claim 11, further comprising the step of attributing said subsequent calls to said one of said plurality of subscribers after said step of activating said telephone line.

13. The method of claim 11, wherein said dedicating step further comprises the step of routing a single telephone call from said telephone line when said escape code has been entered that corresponds to said single telephone call, said escape code activating said telephone line only for said single telephone call.

14. The method of claim 12, wherein another valid code corresponds to another of said plurality of subscribers; and if said another valid code is received, then de-attributing said subsequent calls from said one of said plurality of subscribers and attributing further subsequent calls to said another of said plurality of subscribers for said further subsequent calls associated with said telephone service at said particular location.

15. The method of claim 11, further comprising the steps of:

after activating said telephone line, starting a timer in response to receipt of said valid code; and deactivating said telephone line upon expiration of said timer.

16. The method of claim 11, wherein said activating step comprises:

activating said telephone line only if said valid logon code corresponds to an access code of said user; and if said valid code corresponds to said access code, then activating said telephone line with said telephone service for said user for subsequent calls at said one of said particular locations.

17. A method of restricting use of a telephone service from a telephone line at a particular location to sequential use of said telephone service by a first subscriber and then a second subscriber, comprising the steps of:

checking whether a first code entered at said particular location corresponds to a first valid code of said first subscriber;

if said first code corresponds to said first valid code, then activating and associating said telephone line with said first subscriber for subsequent calls associated with said telephone service at said particular location;

checking whether a second code entered at said particular location corresponds to a second valid code of said second subscriber; and if said second code corresponds to said second valid code, then disassociating said telephone line from said first subscriber and associating said telephone line with said second subscriber for further subsequent calls associated with said telephone service at said particular location.

18. The method of claim 17, further comprising the step of attributing said subsequent calls to said first subscriber after said step of activating said telephone line with said first subscriber.

19. The method of claim 18, further comprising the step of attributing said further subsequent calls to said second subscriber after said step of disassociating said telephone line from said first subscriber and associating said telephone line with said second subscriber.

20. A method of preventing the use of telephone service, with exception of provision of said telephone service in response to entry of an escape code, at a particular location unless a valid logon code of one of a plurality of subscribers is received, comprising the steps of:

providing an association between said telephone service at said particular location and said plurality of subscribers;

receiving a logon code;

checking whether said logon code corresponds to a valid logon code of one of said plurality of subscribers;

if said valid logon code is received, then activating a telephone line for subsequent calls associated with said telephone service at said particular location; and deactivating said telephone line for said telephone service at said particular location in response to receiving a second logon code.

* * * * *